(12) United States Patent
Adams et al.

(10) Patent No.: US 7,737,243 B2
(45) Date of Patent: Jun. 15, 2010

(54) HIGHLY PRODUCTIVE COATING COMPOSITION FOR AUTOMOTIVE REFINISHING

(75) Inventors: Jerome T. Adams, Hockessin, DE (US); Robert John Barsotti, Franklinville, NJ (US); Laura Ann Lewin, Greenville, DE (US); Reinhard Halpaap, Odenthal, DE (US); Dieter Mager, Leverkusen, DE (US); Myron W. Shaffer, New Cumberland, WV (US); James Lamonte Adams, Glenside, PA (US); James William O'Neil, Chadds Ford, PA (US)

(73) Assignees: E. I. du Pont de Nemours and Company, Wilmington, DE (US); Bayer Corporation; Bayer AG

( * ) Notice: Subject to any disclaimer, the term of this patent is extended or adjusted under 35 U.S.C. 154(b) by 62 days.

(21) Appl. No.: 11/804,048

(22) Filed: May 16, 2007

(65) Prior Publication Data

US 2007/0282070 A1 Dec. 6, 2007

Related U.S. Application Data

(60) Provisional application No. 60/800,807, filed on May 16, 2006.

(51) Int. Cl.
*C08G 18/30* (2006.01)
(52) U.S. Cl. .............................. 528/60; 528/44; 528/59
(58) Field of Classification Search .................. 525/123
See application file for complete search history.

(56) References Cited

U.S. PATENT DOCUMENTS

| | | | |
|---|---|---|---|
| 3,124,605 A | 3/1964 | Wagner | |
| 3,903,127 A | 9/1975 | Wagner et al. | |
| 4,211,804 A | 7/1980 | Brizzolara | |
| 4,324,879 A | 4/1982 | Bock et al. | |
| 4,403,003 A | 9/1983 | Backhouse | |
| 4,957,814 A | 9/1990 | Barbee et al. | |
| 5,124,427 A | 6/1992 | Potter et al. | |
| 5,137,972 A | 8/1992 | Cook | |
| 5,208,334 A | 5/1993 | Potter et al. | |
| 5,235,018 A | 8/1993 | Potter et al. | |
| 5,286,782 A | 2/1994 | Lamb et al. | |
| 5,326,820 A | 7/1994 | Hoffmann et al. | |
| 5,667,894 A | 9/1997 | Antonelli et al. | |
| 5,684,084 A | 11/1997 | Lewin et al. | |
| 5,763,528 A | 6/1998 | Barsotti et al. | |
| 5,876,802 A | 3/1999 | Brunnemann et al. | |
| 5,914,383 A | 6/1999 | Richter et al. | |
| 6,020,069 A | 2/2000 | Antonelli et al. | |
| 6,090,939 A | 7/2000 | Richter et al. | |
| 6,096,823 A | 8/2000 | Shaffer | |
| 6,107,392 A | 8/2000 | Antonelli et al. | |
| 6,107,484 A | 8/2000 | Richter et al. | |
| 6,221,494 B1 | 4/2001 | Barsotti et al. | |
| 6,472,493 B1 * | 10/2002 | Huynh-Ba | 528/49 |
| 6,472,943 B1 | 10/2002 | Soong et al. | |
| 2003/0109664 A1 * | 6/2003 | Adams et al. | 528/44 |

FOREIGN PATENT DOCUMENTS

| | | |
|---|---|---|
| DE | 1 954 424 | 5/1971 |
| EP | 1 650 244 A1 | 4/2006 |
| WO | WO 95/28450 | 10/1995 |
| WO | WO 97/44402 | 11/1997 |
| WO | WO 99/05193 | 2/1999 |
| WO | WO 99/40140 | 8/1999 |
| WO | WO 00/12579 | 3/2000 |
| WO | WO 00/55270 | 9/2000 |
| WO | WO 03/025040 A1 | 3/2003 |

OTHER PUBLICATIONS

PCT International Search Report and Written Opinion for International Application No. PCT/US2007/011715 dated Nov. 30, 2007.

* cited by examiner

*Primary Examiner*—Randy Gulakowski
*Assistant Examiner*—Kyle Baumstein

(57) ABSTRACT

This invention relates to coating compositions and more particularly to highly productive coating compositions that quickly harden for sanding or buffing by incorporating therein a polyisocyanate adduct mixture into the coating composition as the crosslinking material. Such coatings are particularly useful for refinishing automobiles and trucks.

19 Claims, No Drawings

HIGHLY PRODUCTIVE COATING COMPOSITION FOR AUTOMOTIVE REFINISHING

CROSS-REFERENCE TO RELATED APPLICATION

This patent application claims the benefit of U.S. Provisional Application Ser. No. 60/800,807 filed on May 16, 2006 which is hereby incorporated by references in its entirety.

FIELD OF THE INVENTION

This invention relates to coating compositions and more particularly to highly productive coating compositions that quickly harden for sanding or buffing by incorporating therein a polyisocyanate adduct mixture into the coating composition as the crosslinking material. Such coatings are particularly useful for refinishing automobiles and trucks.

BACKGROUND OF THE INVENTION

To refinish or repair a finish on vehicles, such as a basecoat/clearcoat finish on automobile or truck bodies, different fast-drying coating compositions have been developed. A number of pigmented and clear air-dry acrylic urethane coatings have been used in the past to repair basecoat/clearcoat finishes, but none meet the rapid drying times and early film hardness that are desired, while also meeting today's performance requirements, such as ease of application, moisture resistance, intercoat adhesion, durability, weathering resistance, and outstanding appearance of the overall finish, such as gloss and DOI (distinctness of image).

A concern to a refinish customer, which is typically the vehicle owner, is that the coating in use has excellent durability and weatherability and an attractive aesthetic appearance.

A key concern of the automobile and truck refinish industry is productivity, i.e., the ability to complete an entire refinish operation in the least amount of time. To accomplish a high level of productivity, any coatings applied need to have the ability to dry at ambient or elevated temperature conditions in a relatively short period of time. The term "dry" means that the resulting finish is physically dry to the touch in a relatively short period of time to minimize dust or dirt pick-up, and, in the case of the basecoat, to allow for the application of the subsequent clear coat.

Before any further work can be done to the finish, the finish must also be sufficiently hard to sand or buff to improve the gloss or to remove minor imperfections. Conventional finishes, however, are unable to cure to a sufficiently hard state in a relatively short period of time, and thus the productivity of a refinish operation is still lacking, since the vehicles cannot be worked on quickly after application.

One approach that has been used to improve the initial film hardness (i.e., film Tg) of a clearcoat composition involves replacing a portion of the conventional polyisocyanate crosslinking agent such as hexamethylene diisocyanate (HDI) trimer with a relatively hard or rigid material such as isophorone diisocyanate (IPDI) trimer. Unfortunately, IPDI has a much slower curing rate than that of HDI. Consequently, much of the IPDI does not get crosslinked and incorporated into the crosslinked coating film, and the Tg of the coating is not significantly raised.

U.S. Pat. No. 6,472,943, issued to Huynh-Ba on Oct. 29, 2002, proposes an improved method for incorporating isophorone polyisocyanates into a refinish coating by significantly increasing the level of catalyst in the coating system.

Although the above-cited composition provides good initial film hardness, better initial film hardness is still desired. Accordingly, a continuing need still exists for a coating composition suited for use as a clearcoat in automotive refinishing that offers very fast dry-to-touch times and higher film hardness after application when cured at ambient or slightly elevated temperatures, so that a vehicle can be moved quickly out of the paint booth so another vehicle can be painted and also can be worked on quickly after application.

The novel coating composition of this invention has the aforementioned desirable characteristics.

SUMMARY OF THE INVENTION

The present invention provides a coating composition having improved initial processability. More particularly, the invention provides a crosslinkable coating composition comprising a film-forming binder and a liquid carrier, wherein the binder contains;

(a) a crosslinkable film-forming resin (such as an oligomer, polymer or a dispersed gelled polymer) having functional groups that are capable of crosslinking with the isocyanate groups of component (b); and, (b) a crosslinking portion comprising a urea- and/or biuret-containing polyisocyanate adduct mixture which comprises the reaction product of at least one aliphatic isocyanate trimer and at least one cycloaliphatic isocyanate trimer, in the presence of a urea and/or biuret forming agent.

Preferably, the mole ratio of aliphatic isocyanate trimer to cycloaliphatic isocyanate trimer in the isocyanate trimer mixture is in the range from 10:1 to 1:10 and isocyanate trimers have a molecular weight average of from 500 to 3000 and an average isocyanate functionality of at least 4.

Preferably, components (a) and (b) are usually packaged separately and are combined just prior to application, because component (b) crosslinks the combined components. The pot-life of the combined components is sufficient to enable the combined components to be applied, typically by spraying, onto the substrate to be coated, typically a vehicle body part, including the entire vehicle body. In such two-pack systems, component (b) is used as is, but it is understood that the polyisocyanate can also be blocked with standard blocking agents for a one-pack system.

When dried at ambient temperatures or slightly elevated temperatures (such as 40° C. to 100° C.), the coating film produced therefrom exhibits a rapid dry-to-touch (dust-free) time and a much improved initial processability, resulting in a hard, tough film that is sandable and buffable shortly after application. The use of this technology reduces the processing time of similar coatings using conventional isocyanates by 20 to 40 minutes.

The coating composition is most suited for use as a clearcoat in automotive refinish applications that is applied over a pigmented basecoat.

This invention is further directed to a process for producing a coating on the surface of a substrate, such as a vehicle body or part thereof, wherein the process comprises:

(a) applying a layer of a pigmented basecoat on the substrate surface, which may be previously primed or sealed or otherwise treated;

(b) applying a layer of clearcoat wet-on-wet on top of the pigmented basecoat; and (c) simultaneously drying the basecoat and clearcoat layers together, preferably at ambient temperatures, to form a basecoat/clearcoat finish on the surface of the substrate, wherein the clearcoat, basecoat and/or primer comprises the crosslinkable coating composition disclosed herein.

By the term "wet-on-wet", it is meant that the transparent clear topcoat is applied to the basecoat without curing or completely drying the basecoat.

Also included within the scope of this invention is a substrate coated with the coating composition disclosed herein.

DETAILED DESCRIPTION OF THE INVENTION

All molecular weights referred to herein are determined by GPC (gel permeation technology) using polystyrene as the standard.

In this disclosure, the terms "isocyanate trimer" and "polyisocyanate trimer" mean a polyisocyanate containing isocyanurate and/or iminooxadiazine dione groups.

The terms "starting trimers" and "starting isocyanate trimer" mean the starting mixture of polyisocyanates which is used to prepare the urea- and/or biuret-containing polyisocyanate adduct mixtures and which contains an aliphatic isocyanate trimer, a cycloaliphatic isocyanate trimer and optionally other polyisocyanate adducts as described below.

The terms "urea- and/or biuret-containing polyisocyanate adduct mixture" or "polyisocyanate adduct mixture" are used interchangeably and unless otherwise indicated, describe a mixture of polyisocyanates containing one or more of an aliphatic isocyanate trimer and a cycloaliphatic isocyanate trimer and one or more of a urea- or biuret-containing reaction product of one of the isocyanate trimers with itself (e.g., one aliphatic isocyanate trimer molecule to another aliphatic isocyanate trimer molecule) or with the other isocyanate trimer (e.g., one aliphatic isocyanate trimer molecule to a cycloaliphatic isocyanate trimer molecule).

The term "urea and/or biuret forming agent" as used herein means a reagent that is capable of causing a reaction between two or more isocyanate groups to form a urea and/or biuret group by converting one of the isocyanate groups to an amino group. Preferred urea and/or biuret forming agents are water, tertiary alcohols and/or pivalic acid, more preferably water. The urea and/or biuret forming agent is used in an amount sufficient to provide 0.01 to 0.15 moles, preferably 0.025 to 0.12 moles and more preferably 0.03 to 0.1 moles of agent for each equivalent of isocyanate groups in the starting isocyanate trimers.

The linking groups that connect the isocyanate trimers to each other, preferably an aliphatic isocyanate trimer to a cycloaliphatic isocyanate trimer, are either urea groups and/or biuret groups. Most preferred are those polyisocyanate adducts that are linked with a single group.

Also present in this mixture will be unreacted starting materials and linked compounds containing only aliphatic isocyanate trimers and linked compounds containing only cycloaliphatic isocyanate trimers. The exact composition will vary dependent upon the ratio of aliphatic to cycloaliphatic isocyanate trimers charged to the reactor, reaction temperatures, and other reaction conditions within the scope of this disclosure. Those skilled in the art will appreciate the difficulties of specifying the exact composition of the reaction product since a number of different reaction products will typically be produced.

The polyisocyanate trimers, which are described in more detail hereinbelow, can be prepared from diisocyanate or triisocyanate monomers, preferably diisocyanate monomers. These products are commercially available under the Desmodur® trademark from Bayer and consist mainly of isocyanurate oligomers of a diisocyanate.

The urea- and/or biuret-containing polyisocyanate adduct mixtures of the present invention are prepared by reacting a reaction mixture comprising a) from 10 to 90 parts by weight of at least one aliphatic isocyanate trimer and b) from 90 to 10 parts by weight of at least one cycloaliphatic isocyanate trimer wherein the sum of a) and b) is 100 parts, based on the total parts of a) and b) and c) 0.01 to 0.15 moles of urea and/or biuret forming agents for each equivalent of isocyanate groups in the isocyanate trimers at a temperature of 50 to 180° C.

The starting aliphatic and cycloaliphatic isocyanate trimers that are used herein to make the polyisocyanate adduct mixtures a) have an average isocyanate functionality of at least 2.8, preferably at least 3.0 and more preferably at least 3.2; and b) contain either isocyanurate or iminooxadiazine dione groups, or mixtures thereof provided that a total of at least 50 mole percent, preferably at least 60 mole percent and more preferably at least 75 mole percent of isocyanurate and iminooxadiazine dione groups must be present, based on the total moles of isocyanate adduct groups present in the starting isocyanate trimers.

As indicated above, each group may be present alone or in a mixture with the other. In one preferred embodiment iminooxadiazine dione groups are present in a mixture with the isocyanurate groups in an amount of at least 10 mole percent, preferably at least 15 mole percent and more preferably at least 20 mole percent, based on the total moles of iminooxadiazine dione and isocyanurate groups.

In one preferred embodiment, the starting isocyanate trimer comprises a mixture of aliphatic isocyanate trimer and cycloaliphatic isocyanate trimer, in a mole ratio in the range of from 3:1 to 1:10. More preferably, the mole ratio of aliphatic isocyanate trimer to cycloaliphatic isocyanate trimer in the starting polyisocyanate trimer mixture is in the range from 3:1 to 1:8. Most preferably, the mole ratio of aliphatic isocyanate trimer to cycloaliphatic isocyanate trimer in the starting polyisocyanate trimer mixture is in the range from 2:1 to 1:5. In a particularly preferred embodiment the aliphatic isocyanate trimer is the trimer of hexamethylene diisocyanate and the cycloaliphatic isocyanate trimer is the trimer of isophorone diisocyanate.

Polyisocyanate trimers used to make the polyisocyanate adduct mixtures according to the invention preferably have an NCO content of 10 to 25% by weight, more preferably 12 to 25% by weight and most preferably 15 to 25% by weight; and preferably have an upper limit for the functionality of 8, more preferably 7 and most preferably 6. The starting material to prepare the starting isocyanate trimers preferably contains at least 70% by weight, more preferably at least 80% by weight and most preferably at least 90% by weight of diisocyanates, preferably 1,6-hexamethylene diisocyanate is used to prepare the aliphatic isocyanate trimers and isophorone diisocyanate is used to prepare the cycloaliphatic isocyanate trimers. Other polyisocyanate adducts that may be present in admixture with the starting isocyanate trimers include polyisocyanates containing uretidione, biuret, urethane, allophanate, carbodiimide and/or oxadiazinetrione, preferably uretidione, biuret, urethane and/or allophanate groups. While other isocyanate adduct groups may be present, a total of at least 50 mole percent, preferably at least 60 mole percent and more preferably at least 75 mole percent of isocyanurate and iminooxadiazine dione groups must be present, based on the total moles of isocyanate adduct groups present in the starting isocyanate trimers.

Polyisocyanate trimers containing isocyanurate groups and methods and catalysts for their preparation are known and may be prepared in accordance with the process and catalysts described in U.S. Pat. No. 4,324,879, herein incorporated by reference. Even though this reference is limited to the use of 1,6-hexamethylene diisocyanate, any aliphatic or cycloaliphatic isocyanate trimer may be prepared. In the present invention, these trimers are generally preferred as the starting materials. Typically useful examples of such polyisocyanates containing isocyanurate groups are those formed from any of the conventional aliphatic and cycloaliphatic diisocyanates that are listed below. Preferred aliphatic trimers are those prepared from 1,6-hexamethylene diisocyanate which is sold under the tradename Desmodur® N-3300. Preferred cycloaliphatic isocyanate trimers are those prepared from isophorone diisocyanate which is sold under the tradename Desmodur® Z-4470.

Starting isocyanate trimers containing iminooxadiazine dione and optionally isocyanurate groups are also known and may be prepared in the presence of special fluorine-containing catalysts as described in U.S. Pat. Nos. 5,914,383, 6,107,484 and 6,090,939, herein incorporated by reference.

The other adduct groups, which have been previously described, may be incorporated in known manner either by separately preparing these adducts and then blending them with the polyisocyanate trimers containing isocyanurate and/or minooxadiazine dione groups or by simultaneously preparing the other adduct groups.

For example, starting polyisocyanates containing isocyanurate groups and allophanate groups may be prepared simultaneously in accordance with the processes set forth in U.S. Pat. Nos. 5,124,427, 5,208,334 and 5,235,018, the disclosures of which are herein incorporated by reference. Examples of other starting polyisocyanates are those containing isocyanurate and urethane groups which may be prepared simultaneously from an organic polyisocyanate and a polyol. Any of the diisocyanates listed below can be used with a polyol to form such an adduct. Polyols such as trimethylol alkanes like trimethylol propane or ethane can be used.

Suitable methods for preparing polyisocyanates containing uretidione groups, urethane groups, allophanate groups, carbodiimide groups and oxadiazinetrione groups for subsequent blending with the polyisocyanates containing isocyanurate and/or iminooxadiazine dione groups to form the starting polyisocyanates are described in U.S. Pat. No. 6,096,823, the disclosure of which is herein incorporated by reference. These known polyisocyanates may also be blended with the polyisocyanate adducts according to the invention depending upon the particular application needs.

Any of the conventional aliphatic and cycloaliphatic diisocyanates can be used to form the desired polyisocyanate trimers listed above. Typically useful diisocyanates include, without limitation, 1,6-hexamethylene diisocyanate, 1,4-tetramethylene diisocyanate, isophorone diisocyanate, bis cyclohexyl diisocyanate, tetramethyl xylylene diisocyanate, 1,4-cyclohexylene diisocyanate, bis-(4-isocyanatocyclohexyl)-methane, and the like.

The urea- and/or biuret-containing polyisocyanate adduct mixtures according to the invention have an isocyanate functionality of at least 4, preferably at least 4.5 and more preferably at least 4.8 and an NCO content of 10 to 24% by weight, preferably 12 to 22% by weight and more preferably 13 to 20% by weight, based on the weight of the polyisocyanate. The polyisocyanate adduct mixtures preferably have a maximum functionality of 10, more preferably 8 and most preferably 7. The products can be suitably reduced in solvent for use.

To prepare the polyisocyanate adduct mixtures according to the present invention the starting polyisocyanate trimers are reacted preferably in the presence of water as a biuretizing agent, optionally in an admixture with other known biuretizing agents. The other known biuretizing agents may be present in amounts of up to 50 mole percent, preferably up to 20 mole percent, based on the total moles of biuretizing agent. Most preferably water is used as the sole biuretizing agent. Suitable processes are disclosed in U.S. Pat. Nos. 3,124,605 and 3,903,127, the disclosures of which are herein incorporated by reference. The biuretizing agent is used in an amount sufficient to provide 0.01 to 0.15 moles, preferably 0.025 to 0.12 moles and more preferably 0.03 to 0.1 moles of biuretizing agent for each equivalent of isocyanate groups in the starting isocyanate trimers. The reaction is carried out at a temperature of 50 to 180° C., preferably 60 to 160° C. and more preferably 70 to 140° C., until all of the biuretizing agent has reacted.

The inventors have surprisingly discovered that by chemically incorporating the slower reacting, relatively high $T_g$ isophorone diisocyanate-based trimers into the polyisocyanate adduct mixture with the faster reacting, relatively low $T_g$ hexamethylene diisocyanate-based trimers, the film $T_g$ of the curing composition can be more quickly increased. While not wishing to be bound by any one particular theory, it is believed that the chemical mixture of an aliphatic polyisocyanate moiety and a cycloaliphatic polyisocyanate moiety in a single compound allows film-forming binders to build film $T_g$ quickly, leading to faster processing times. It is known that the isocyanate groups of 1,6-hexamethylene diisocyanate (HDI) trimers react relatively quickly with crosslinkable film-forming binders but do not provide a high film $T_g$ into the crosslinking film to allow a fast processability time. It is also known that isophorone diisocyanate (IPDI) trimers tend to react slowly with film-forming binders but provide relatively high film $T_g$ when they do react. Similarly, it is known that a two component crosslinking system that uses HDI trimer as one component for fast crosslinking and IPDI trimer as the second component for its relatively high $T_g$ forms coatings that initially have a relatively low film $T_g$. It is only after an extended curing time that the IPDI is able to crosslink into the system that the $T_g$ rises appreciably.

In accordance with the invention, a portion of the HDI and IPDI trimers are chemically linked in the polyisocyanate adduct mixture. The wt % of linked product in the polyisocyanate adduct mixture, based on the weight of the polyisocyanate mixture, is preferably 5% to 80%, more preferably 7% to 70%, and most preferably 10% to 60%. In this way, every time that the fast-reacting moiety from a mixed linked adduct crosslinks into the film, a relatively high $T_g$ moiety is also added to the film, thus rapidly increasing film $T_g$. This provides a crosslinking agent that can improve the processing times significantly over the prior art. The Refinish applicator can more quickly sand or buff the finish to improve the appearance. The cycle time of refinishing vehicles is also improved as the vehicle can be moved outside to free up workspace in the auto body repair shop.

The products obtained by the process are particularly suitable as curing agents in coating compositions, especially in automotive coatings. In such applications, the products may be used as is or may be blocked with any of the conventional blocking agents. Such products are also a part of this invention. Typical blocking agents are alcohols, ketimines, oximes and the like. Blocking agents are normally employed when formulating one-pack coatings.

The coating compositions of this invention also contain at least one film-forming binder which comprises an isocyanate-reactive oligomer or polymer or dispersed gelled polymer, and the blocked or unblocked polyisocyanate adduct mixture as described above.

The coating compositions of this invention preferably are formulated into one- or two-pack liquid solvent borne or waterborne coating compositions. Although the compositions are preferably liquid coating compositions, they may be formulated into powder coating compositions as well.

A typical steel auto or truck body has several layers of coatings. The steel is typically first coated with an inorganic rustproofing zinc or iron phosphate layer over which a primer coating is applied which is typically an electrocoated primer or can be a repair primer. A typical electrocoat primer comprises a cathodically depositable epoxy modified resin that is crosslinked with a polyisocyanate. A typical repair primer comprises an alkyd resin. Optionally, a primer surfacer and/or sealer can be applied over the primer coating to provide for better appearance and/or improved adhesion of the basecoat to the primer coat. A pigmented basecoat or color coat is next applied over the primer surfacer. A typical basecoat comprises a pigment, which may include metallic flakes in the case of a metallic finish, and polyester or acrylourethane as a film-forming binder. A clear topcoat (clearcoat) is then applied to the pigmented basecoat (colorcoat). The color coat and clearcoat are preferably applied to have a dry film thickness of about 0.1-3 mils and 0.5-5.0 mils, respectively. A composition of this invention, depending on the presence of pigments or other conventional components, may be used as a basecoat, clearcoat, a single stage paint system, or even as an undercoat such as a primer or sealer. By "single stage paint system" it is meant that a paint coating that forms a glossy colored coating upon drying and curing.

A typical solvent borne coating composition of this invention useful for finishing or refinishing clear coat/color coat finishes for automobiles and trucks contains about 10%-60% by weight of an organic liquid carrier and correspondingly, about 40%-90% by weight of film forming binder. Preferably, the coating composition is a high solids composition that contains about 35%-80% by weight of film-forming binder and 20%-65% by weight of the organic liquid carrier. The coating composition is also preferably a low VOC composition that has a VOC content of less than 5 pounds of solvent per gallon and preferably in the range of about 2.0 to 4.5 pounds of solvent per gallon of coating composition, as determined under the procedure provide in ASTM D-3960. The binder contains about 10% to 90% by weight of a polymer or oligomer or dispersed gelled polymer having functional components that are capable of reacting with isocyanate groups on the polyisocyanate crosslinking agent which comprises about 10% to 90% by weight of the binder.

As indicated above, the coating composition is particularly suited for use as a clear coat in automotive refinishing and finishing but can be pigmented with conventional pigments and used as a monocoat or as a basecoat or even as an undercoat such as a primer or sealer. These coatings may also be used in non-automotive applications such as in industrial and architectural applications.

The oligomers useful in the coating composition have functional components capable of reacting with the isocyanate groups of the polyisocyanate adduct mixtures and a weight average molecular weight of about 200 to 2,000 and a polydispersity of less than 1.7.

Typically useful oligomers include hydroxy functional caprolactone oligomers which may be made by reacting caprolactone with a cyclic polyol. Particularly useful caprolactone oligomers are described on col. 4 line 3 to col. 5 line 2 of Lamb et al U.S. Pat. No. 5,286,782 issued Feb. 15, 1994, the disclosure of which is herein incorporated by reference.

Other useful hydroxy functional oligomers are polyester oligomers such as an oligomer of an alkylene glycol, like propylene glycol, an alkane diol, like hexane diol, and an anhydride like methyl hexahydrophthalic anhydride reacted to a low acid number. These oligomers are described in Barsotti et al U.S. Pat. No. 6,221,494 issued Apr. 24, 2001, the disclosure of which is herein incorporated by reference. Other useful oligomers are hydroxy functional and are formed by reacting a monofunctional epoxy such as 1,2 epoxy butane with the below described acid functional oligomers using triethyl amine as a reaction catalyst resulting in very low (less than 20) acid number oligomers. The acid functional oligomers that are used as precursors for the hydroxy functional oligomers include, for example, an oligomer of a polyol such as pentaerythritol reacted with an anhydride such as methyl hexahydrophthalic anhydride to an acid number of about 30 to 300, preferably 150 to 250. The forgoing hydroxyl functional oligomers are described in Barsotti et al WO 99/05193 published Feb. 4, 1999, herein incorporated by reference.

Additional reactive oligomers include reactive silicon oligomers having a linear or branched cycloaliphatic moiety and at least two functional groups with at least one being a silane or a silicate group, the remaining being a hydroxyl group. Such silicon oligomers are described in Barsotti et al WO 99/40140 published Aug. 12, 1999, herein incorporated by reference. Other reactive oligomers include aldimine oligomers which are the reaction products of alkyl aldehydes, such as, isobutyraldehyde with diamines, such as isophorone diamine. Ketimine oligomers which are the reaction product of alkyl ketones, such as, methyl isobutyl ketone with diamines, such as, 2-methyl pentamethylene diamine. Polyaspartic esters, which are the reaction product of diamines, such as, isophorone diamine with dialkyl maleates, such as, diethyl maleate. Other useful oligomers are described in Barsotti et al WO 97/44402 published Nov. 27, 1997, the disclosure of which is herein incorporated by reference. All of the foregoing additional molecules are well known in the art.

Besides the oligomers, the binder for the coating composition may be an acrylic polymer or polyester having functional components capable of reacting with isocyanate groups. It is preferred to use such polymers in combination with any of the aforementioned oligomers for improved film integrity.

Typically useful acrylic polymers include acrylic polyols having a weight average molecular weight in the range from 2,000 to 50,000, preferably 3,000 to 20,000 and a $T_g$ preferably in the range of 0° C. to 80° C., which are made from typical monomers such as acrylates, methacrylates, styrene and the like and functional monomers such as hydroxy ethyl acrylate, glycidyl methacrylate, or gamma methacryloyl propyl trimethoxy silane, t-butyl amino ethyl methacrylate, and the like. The details of acrylic polymers suitable for use in this invention are provided in Lamb et al. U.S. Pat. No. 5,286,782 issued Feb. 15, 1994, herein incorporated by reference.

A typical acrylic polymer is composed of polymerized monomers of styrene, a methacrylate which is either methyl methacrylate, isobornyl methacrylate, cyclohexyl methacrylate, or a mixture of these monomers and a second methacrylate monomer which is either isobutyl methacrylate, n-butyl methacrylate or ethyl hexyl methacrylate or a mixture of these monomers and a hydroxyl alkyl methacrylate or acrylate that has 1-4 carbon atoms in the alkyl group such as hydroxyl ethyl methacrylate, hydroxy propyl methacrylate, hydroxy butyl methacrylate, hydroxy ethyl acrylate, hydroxy propyl acrylate, hydroxyl butyl acrylate and the like.

One such acrylic polymer contains about 5% to 20% by weight of styrene, 10% to 30% by weight of the methacrylate, 30% to 60% by weight of other non-hydroxy group containing methacrylate(s) and 10% to 30% by weight of the hydroxy alkyl methacrylate. The total percentage of the monomers in the polymer equal 100%.

Another such acrylic polymer contains the following constituents in the above percentage ranges: 5% to 20% by weight of styrene, 10% to 30% by weight of methyl methacrylate, 30% to 60% by weight of isobutyl methacrylate or n-butyl methacrylate and 10% to 30% by weight of hydroxy ethyl methacrylate. The total percentage of the monomers in the polymer is equal to 100%.

Another such acrylic polymer contains the following constituents in the above percentage ranges: 5% to 20% by weight of styrene, 10% to 30% by weight of methyl methacrylate, 30% to 60% by weight of a mixture of isobornyl methacrylate/2-ethyl hexyl methacrylate/isobutyl methacrylate and 10% to 30% by weight of hydroxy ethyl methacrylate.

Other useful acrylic polymers include acrylosilane polymers can also be used having a weight average molecular weight in the range from about 1,000 to 10,000, which are made from typical monomers such as methacrylates, acrylates, styrene, and functional monomers, such as hydroxy alkyl acrylate, hydroxy alkyl methacrylate, and an ethylenically unsaturated hydroxy functional acrylosilane.

One typical acrylosilane polymer is the polymerization product of an alkyl methacrylate, an alkyl acrylate each having 1 to 8 carbon atoms in the alkyl group, isobornyl methacrylate, styrene, hydroxy alkyl methacrylate having 1 to 4 carbon atoms in the alkyl group, and 5% to 40% by weight of an ethylenically unsaturated silane containing monomer, including alkoxysilanes such as vinylalkoxy silanes, for example, vinyl trimethoxy silane, vinyl triethoxy silane and vinyl tris(2-methoxyethoxy) silane, and the like. Other useful silane monomers are acyloxysilanes, including acrylatoxy silane, methacrylatoxy silane and vinylacetoxy silanes, such as vinylmethyl diacetoxy silane, acrylatopropyl triacetoxy silane, and methacrylatopropyltriacetoxy silane, and any mixtures thereof. The details of acrylosilane polymers useful herein are described in Lewin et al U.S. Pat. No. 5,684,084 issued Nov. 4, 1997, herein incorporated by reference.

Typically useful polyesters include polyester polyols having a weight average molecular weight in the range from 1,000 to 50,000, preferably from 2,000 to 5000 and a Tg preferably in the range from −50° C. to 100° C. The polyesters suitable for use in the invention are conventionally polymerized from suitable polyacids, including cycloaliphatic polycarboxylic acids, and suitable polyols, which include polyhydric alcohols. The details of polyesters suitable for use in this invention are provided in Hoffmann et al U.S. Pat. No. 5,326,820 issued Jul. 5, 1994, herein incorporated by reference. One of the commercially available polyester, which is particularly preferred, is SCD®-1040 polyester, which is supplied by Etna Product Inc., Chagrin Falls, Ohio.

Other film-forming polymers can also be used such as polyurethane polyols, acrylourethanes, polyester urethanes and polyether urethanes, and the like.

Dispersed gelled polymers, sometimes called non-aqueous dispersions, containing functional groups capable of reacting with isocyanate groups can also be used in the coating composition, preferably dispersed gelled acrylic polymers. Examples of hydroxy functional dispersed gelled acrylic polymers include acrylic polymers which have a core formed from polymerized monomers of methyl methacrylate, glycidyl methacrylate, methacrylic acid, methyl acrylate and stabilizing polymeric components formed from a macromonomer of styrene, butyl methacrylate, butyl acrylate, hydroxy ethyl acrylate, methacrylic acid, isobornyl methacrylate, and glycidyl methacrylate. The core is formed from a high molecular weight polymer having a weight average molecular weight of 50,000 to 500,000, preferably in the range of from 50,000 to 200,000. Arms, attached to the core, make up about 10% to 90% of the polymer and are formed from low molecular weight macromonomer having an average molecular weight of in the range from about 500 to 20,000, preferably 3,000 to 20,000. The details of dispersed gelled polymers that can be used in the present composition are provided in Barsotti et al. U.S. Pat. No. 5,763,528, herein incorporated by reference.

Mixtures of any of the aforementioned oligomers or polymers or dispersed gelled polymers can also be used.

The polyisocyanate curing agent used in the coating composition is the polyisocyanate adduct mixture described above. The polyisocyanate is generally provided in an effective amount to rapidly cure the coating under ambient conditions (about 20° C.). The isocyanate reactive and polyisocyanate components, respectively, are preferably employed in an equivalent ratio of isocyanate groups to hydroxyl groups of 0.5/1 to 3.0/1, more preferably 0.8/1 to 2.0/1. As described above, the polyisocyanate may be blocked or unblocked.

Optionally, the polyisocyanate adduct mixture curing agent described above can be combined with other conventional organic polyisocyanate crosslinking agents to enhance the film forming ability of the coating composition.

Any of the conventional aromatic, aliphatic, cycloaliphatic, diisocyanates, trifunctional isocyanates and isocyanate functional adducts of a polyol and a diisocyanate can be used. Typically useful diisocyanates include those listed above, such as 1,6-hexamethylene diisocyanate, isophorone diisocyanate, 4,4'-biphenylene diisocyanate, toluene diisocyanate, bis-cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopenthylene diisocyanate, 1,4-cyclohexylene diisocyanate, 1,3-phenylene diisocyanate, 1,5-naphthalene diisocyanate, bis-(4-isocyanatocyclohexyl)-methane, diisocyanatodiphenyl ether and the like. Typical trifunctional isocyanates that can be used are triphenylmethane triisocyanate, 1,3,5-benzene triisocyanate, 2,4,6-toluene triisocyanate and the like. Trimers of diisocyanates can also be used such as the trimer of hexamethylene diisocyanate which is sold under the tradename Desmodur® N-3390, as well as any of the other trimers listed above. Isocyanate functional adducts can be used that are formed from an organic polyisocyanate and a polyol. Any of the aforementioned polyisocyanates can be used with a polyol to form the adduct. Polyols such as trimethylol alkanes like trimethylol propane or ethane can be used. One useful adduct is the reaction product of tetramethylxylidene diisocyanate and trimethylol propane and is sold under the tradename of Cythane® 3160.

Blocked polyisocyanates can also be used. Typical blocking agents are those listed above such as alcohols, ketimines, oximes and the like.

The polyisocyanate adduct mixture crosslinking agent(s) described above can also be optionally combined with any of the conventional melamine curing agents for enhanced film integrity. Any of conventional monomeric or polymeric partially alkylated melamine formaldehyde melamine can be used, although monomeric alkoxy melamines are preferred. Typical alcohols that are used to alkylate these resins are methanol, ethanol, propanol, butanol, and the like. The details of such melamine resins suitable for use herein are described in Uhlianuk et al WO 00/55270 published Sep. 21, 2000, herein incorporated by reference. Preferred alkylated melamine crosslinking agents that are commercially available include Cymel® 373, Cymel® 385, and Cymel® 1168 resins. Cymel resins are available from Cytec Industries, West Paterson, N.J.

In the coating composition of the present invention, the aforementioned isocyanate or isocyanate/melamine component, also referred to herein as the activator, is typically stored separately from the other binder components prior to application. This results in a two-pack coating composition which is generally preferred.

To improve weatherability of the clear composition about 0.1% to 10% by weight, based on the weight of the binder, of ultraviolet light stabilizers screeners, quenchers and antioxidants can be added. Typical ultraviolet light screeners and stabilizers include the following:

Benzophenones such as hydroxy dodecycloxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxyphenyl derivatives of triazine, sulfur containing derivatives of dialkyl-4-hydroxy phenyl triazine, hydroxy phenyl-1,3,5-triazine and the like.

Triazoles such as 2-phenyl-4-(2,2'-dihydroxy benzoyl)-triazole, substituted benzotriazoles such as hydroxy-phenyltriazole and the like.

Hindered amines such as bis(1,2,2,6,6-pentamethyl-4-piperidinyl sebacate), di[4(2,2,6,6-tetramethyl piperidinyl)]sebacate and the like and any mixtures of any of the above.

The coating composition preferably contains sufficient amount of a catalyst or catalyst blend to cure the composition at ambient temperatures. Generally, about 0.01% to 2% by weight, based on the weight of the binder, of catalyst is used. Typically useful catalysts are tertiary amines such as triethylene diamine and alkyl tin esters such as dibutyl tin dilaurate, dibutyl tin diacetate, and the like. Typically, these are combined with acetic acid to improve the pot life of the composition.

Generally, flow control agents are used in the composition in amounts of about 0.1% to 5% by weight, based on the weight of the binder, such as polyacrylic acid, polyalkylacrylates, polyether modified dimethyl polysiloxane copolymer and polyester modified polydimethyl siloxane.

Conventional solvents and diluents are used to disperse and/or dilute the above mentioned polymers to obtain the present composition. Non-limiting examples of organic solvents that may be used in the present invention are, aliphatic, aromatic and/or cycloaliphatic hydrocarbons, alkyl esters of acetic acid or propionic acid, alkanols, ketones, glycol ethers and/or glycol ether esters and the like.

When used as a clear coating, it may be desirable to use pigments in the coating composition which have the same refractive index as the dried coating. Typically, useful pigments have a particle size of about 0.015 to 50 microns and are used in a pigment to binder weight ratio of about 1:100 to 10:100 and are inorganic siliceous pigments such as silica pigment having a refractive index of about 1.4 to 1.6.

In the application of the coating composition as a clear coating to a vehicle such as an automobile or a truck, the basecoat which may be either a solvent based composition or a waterborne composition is first applied and then dried to at least remove solvent or water before the clear coating is applied usually by conventional spraying. Electrostatic spraying may also be used. The dry film thickness of the clear coating is about 0.5 mils to 5 mils. The clear coating is dried at ambient temperatures generally in less than 5 minutes to a tack and dust free state. Moderately higher temperatures up to about 40° C. also can be used. As soon as the clear coating is sufficiently cured to be dust free and tack free the vehicle can be moved from the work area to allow for the refinishing of another vehicle.

Generally, within about 1 to 6 hours after application, the clear coating is sufficiently cured to allow for buffing and polishing if needed to remove imperfections and improve gloss of the finish. The clear coating continues to cure and after 7 to 10 days reaches a relatively high level of hardness that is required for a durable and weatherable automotive finish.

The coating composition of this invention can also be pigmented and used as a basecoat in a clear coat/color coat finish or as a monocoat or even as an undercoat such as a primer or sealer. Typical pigments that are used in such a coating composition are metallic oxides such as titanium dioxide, iron oxides of various colors, zinc oxide, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimilazolinones, and metallic flake pigments such as aluminum flake, nickel flake or mica and the like. The pigments are usually introduced into the coating by first forming a mill base or pigment dispersion with a polymer dispersant by conventional techniques, such as high speed mixing, sand grinding, ball milling, attritor grinding or two roll milling. The mill base is then blended with the other constituents used in the coating composition.

Coating compositions of this invention have excellent adhesion to a variety of metallic or non-metallic substrates, such as previously painted substrates, cold rolled steel, phosphatized steel, and steel coated with conventional primers by electrodeposition. These coating compositions can be used to coat plastic substrates such as polyester reinforced fiberglass, reaction injection-molded urethanes and partially crystalline polyamides.

Coating compositions of this invention can be applied by conventional techniques such as spraying, electrostatic spraying, dipping, brushing, flowcoating and the like. The preferred techniques are spraying and electrostatic spraying. In refinish applications, the composition is generally dried and cured at ambient temperatures but can be forced dried at elevated temperatures of 40° C. to 100° C. for about 5 to 30 minutes. For O.E.M. (original equipment manufacture) applications, the composition is typically baked at 100° C. to 150° C. for about 15 to 30 minutes to form a coating about 0.1 to 3.0 mils thick. When the composition is used as a clearcoat, it is applied over the color coat, which may be dried to a tack-free state and cured, or preferably flash dried for a short period before the clearcoat is applied. The color coat/clearcoat finish is then baked as mentioned above to provide a dried and cured finish. The present invention is also applicable to non-baking refinish systems, as will be readily appreciated by those skilled in the art.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The present invention also provides waterborne coating compositions formulated with the polyisocyanate adducts of this invention. These compositions are particularly useful in formulating waterborne basecoats for clear coat/color coat finishes for automobiles and trucks. The waterborne compositions generally comprise a film-forming binder and an aqueous carrier medium comprising at least 50% water. The film-forming binder contains the polyisocyanate adduct curing agent and one or more water-dispersible binder polymers or oligomers containing functional groups that are reactive with isocyanates, such as hydroxy-acid acrylic polymers that have been neutralized with an inorganic base or amine. The aqueous carrier also typically contains minor amounts of a water-miscible solvent to help solubilize the binder components in the aqueous carrier medium. The coating also contains the usual other additives such as those listed above. Examples of polymers or oligomers and other additives useful in such waterborne compositions are described in Antonelli et al U.S. Pat. No. 6,107,392 issued Aug. 22, 2000 and Brunnemann et al. U.S. Pat. No. 5,876,802, the disclosures of which are herein incorporated by reference. Waterborne latex coatings can also be made using crosslinked polymer microparticles, such as those described in Backhouse U.S. Pat. No. 4,403,003 issued Sep. 6, 1983, herein incorporated by reference.

Moisture-cure coating compositions can also be formulated with the polyisocyanate adduct mixtures of the present invention. Such compositions typically comprise polyisocyanate alone and conventional moisture-cure catalyst. The details of moisture cure compositions can be found in Brizzolara U.S. Pat. No. 4,211,804 issued Jul. 8, 1980, herein incorporated by reference.

Cathodic electrocoating compositions can also be formulated with the polyisocyanate adduct mixtures. Resin compositions used in electrocoating baths of a typical cathodic electrodeposition process also well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent usually a blocked polyisocyanate and then neutralized with an acid to form a water emulsion which is usually referred to as a principal emulsion. The principal emulsion that is formed is then combined with pigment, coalescent solvents, water, and other additives to form the electrocoating bath. Electrodeposition of primers to automotive substrates is widely used in the automotive industry. Cathodic electrocoating compositions, resin compositions, coating baths and cathodic electrodeposition processes are disclosed in U.S. Pat. Nos. 5,667,894 and 6,020,069, herein incorporated by reference.

The present invention also provides low VOC, essentially solventless, crosslinkable powder coating compositions containing the polyisocyanate adducts of this invention. These powder coatings are particularly useful for automotive primer or clear coat applications. The powder coating generally comprises a particulate mixture of the polyisocyanate curing agent of this invention and a high Tg (glass transition temperature) polymer having functional groups that are reactive with the polyisocyanate curing agent, together with the usual other additives. Acrylic polyols and polyester polyols are generally preferred having a Tg above room temperature. The details of the polymers and other additives suitable for use in the powder coatings of the present invention are described in WO 00/12579, DE 1954424, WO 95/28450, U.S. Pat. No. 4,957,814, the disclosures of which are herein incorporated by reference.

The invention will be further described by reference to the following Examples. All parts and percentages are on a weight basis unless otherwise indicated. All molecular weights disclosed herein are determined by GPC (gel permeation chromatography) using a polystyrene standard.

EXAMPLES

The following examples (examples 1-18) show the preparation of the polyisocyanate adduct in accordance with the present invention using water as the adduct forming agent.

The following polyisocyanate trimers were used as starting materials to form the final adduct.

Polyisocyanate 3300

An isocyanurate group-containing polyisocyanate prepared from 1,6-hexamethylene diisocyanate and having an isocyanate content of 21.8%, a content of monomeric diisocyanate of <0.2% and a viscosity at 20° C. of 2500 mPa·s (available from Bayer MaterialScience as Desmodur® N 3300).

Polyisocyanate 3600

An isocyanurate group-containing polyisocyanate prepared from 1,6-hexamethylene diisocyanate and having an isocyanate content of 23.0%, a content of monomeric diisocyanate of <0.25% and a viscosity at 25° C. of 1200 mPa·s (available from Bayer MaterialScience as Desmodur® N 3600).

Polyisocyanate 2294

An isocyanurate and iminooxadiazine dione group-containing polyisocyanate prepared from 1,6-hexamethylene diisocyanate and having an isocyanate content of 23.3%, a content of monomeric diisocyanate of <0.30% and a viscosity at 25° C. of 1000 mPa·s (available from Bayer MaterialScience as Desmodur® LS 2294).

Polyisocyanate 4470

An isocyanurate group-containing polyisocyanate prepared from isophorone diisocyanate and having an isocyanate content of 11.9%, a content of monomeric diisocyanate of <0.50% and a viscosity at 25° C. of 670 mPa·s as a 70% solution in n-butyl acetate (available from Bayer MaterialScience as Desmodur® Z 4470 BA).

Preparation of Polyisocyanate Adducts

The following polyisocyanate adducts were prepared from the above trimers and then used to form the following coating compositions.

Example 1

A 3-liter 3-necked flask equipped with a cold water condenser, thermocouple, heating mantle, mechanical stirrer and nitrogen inlet was charged with 539 parts (2.79 eq) of an HDI trimer (Polyisocyanate 3300), 770 parts (2.18 eq) of an IPDI trimer (Polyisocyanate 4470), and 488 parts of n-butyl acetate (BA). The mixture was stirred at room temperature under a nitrogen blanket until homogenous. 5.91 grams (0.99 eq) of distilled water and 0.54 grams of dibutyl phosphate (500 ppm of catalyst, based on polyisocyanate solids) were then added to the flask and the reaction mixture was heated to 140° C. After 8 hours, the reaction mixture was cooled to room temperature. The resulting product had an NCO content of 9.57% (determined by potentiometric titration and a viscosity of 158 cps at 60% weight solids in BA (determined on a Brookfield RS Rheometer at 25° C., 100 shear rate, for 4 minutes with a C50-1 spindle).

Examples 2 through 18

Examples 2-18 were prepared by the same method as Example 1 with the exception that in Examples 2-17 the reaction temperature varied between 120° C. to 140° C. and the reaction time varied between 8 to 9 hours and in Example 18 the reaction temperature varied between 100° C. to 110° C. and the reaction time was 10 hours. Details of Examples 1-18 are set forth in Table 1.

TABLE 1

| | Example | | | | | | | | |
|---|---|---|---|---|---|---|---|---|---|
| | 1 | 2 | 3 | 4 | 5 | 6 | 7 | 8 | 9 |
| Polyisocyanate A | 3300 | 3300 | 3300 | 3300 | 3300 | 3300 | 3300 | 3300 | 3300 |
| Polyisocyanate B | 4470 | 4470 | 4470 | 4470 | 4470 | 4470 | 4470 | 4470 | 4470 |
| A/B solids ratio | 1/1 | 1/2 | 1/3 | 1/3.7 | 1/4 | 1/4.3 | 2/1 | 1/1 | 1/2 |
| Polyisocyanate A, parts | 539 | 360 | 150 | 492 | 420 | 439.5 | 700 | 200 | 130 |
| Polyisocyanate A, eq | 2.79 | 1.87 | 0.78 | 2.55 | 2.18 | 2.28 | 3.63 | 1.04 | 0.67 |
| Polyisocyanate B, parts | 770 | 1028.6 | 643 | 2600 | 2400 | 2700 | 500 | 285.7 | 371 |
| Polyisocyanate B, eq | 2.18 | 2.91 | 1.82 | 7.37 | 6.80 | 7.65 | 1.42 | 0.81 | 1.05 |
| Butyl Acetate, parts | 488 | 411.4 | 207 | 211 | 196 | 190 | 550 | 181.3 | 149 |
| % Solids | 60 | 60 | 60 | 70 | 70 | 70 | 60 | 60 | 60 |
| Water, parts | 5.91 | 5.85 | 3.26 | 12.58 | 11.25 | 12.66 | 5.85 | 2.78 | 2.65 |
| Water, eq | 0.99 | 0.98 | 0.54 | 2.10 | 1.88 | 2.11 | 0.98 | 0.46 | 0.44 |
| Catalyst, parts | 0.54 | 0.54 | 0.30 | 1.55 | 1.57 | 0.53 | 0.53 | 0.20 | 0.20 |
| % NCO | 9.57 | 9.01 | 9.20 | 10.01 | 9.94 | 9.90 | 9.91 | 9.33 | 9.67 |
| Viscosity | 158 | 247 | 46 | 3951 | 4058 | 5106 | 117 | 299 | 1528 |

| | Example | | | | | | | | |
|---|---|---|---|---|---|---|---|---|---|
| | 10 | 11 | 12 | 13 | 14 | 15 | 16 | 17 | 18 |
| Polyisocyanate A | 3300 | 3600 | 2294 | 2294 | 2294 | 2294 | 2294 | 2294 | 2294 |
| Polyisocyanate B | 4470 | 4470 | 4470 | 4470 | 4470 | 4470 | 4470 | 4470 | — |
| A/B solids ratio | 2/1 | 1/4 | 1/1 | 1/2 | 1/3 | 1/4 | 1/4 | 2/1 | — |
| Polyisocyanate A, parts | 267 | 402.5 | 530 | 350 | 175 | 245 | 385 | 350 | 108 |
| Polyisocyanate A, eq | 1.38 | 2.20 | 2.90 | 1.91 | 0.96 | 1.34 | 2.10 | 1.91 | 267.69 |
| Polyisocyanate B, parts | 190 | 2300 | 757 | 1000 | 750 | 1400 | 2200 | 250 | — |
| Polyisocyanate B, eq | 0.54 | 6.52 | 6.21 | 2.83 | 2.12 | 3.97 | 6.23 | 0.71 | — |
| Butyl Acetate, parts | 210 | 178 | 473.4 | 393.8 | 242 | 397 | 165 | 271.6 | 12 |
| % Solids | 60 | 70 | 60 | 60 | 60 | 60 | 70 | 60 | 90 |
| Water, parts | 2.84 | 10.96 | 6.60 | 6.20 | 4.05 | 6.93 | 11.44 | 3.43 | 0.77 |
| Water, eq | 0.47 | 1.83 | 1.10 | 1.03 | 0.68 | 1.16 | 1.91 | 0.57 | 58.21 |
| Catalyst, parts | 0.20 | 1.35 | 0.53 | 0.53 | 0.35 | 0.63 | 1.30 | 0.27 | 0.05 |
| % NCO | 9.44 | 10.19 | 10.06 | 9.31 | 8.96 | 8.90 | 10.01 | 10.39 | 17.32 |
| Viscosity | 259 | 3405 | 126 | 194 | 326 | 327 | 2268 | 89 | 3231 |

The following examples demonstrate that coatings produced when using the polyisocyanate adducts produced according to the present invention have improved properties, when compared to commonly used polyisocyanates.

Clear Coating Examples

The ingredients for each example in table 2 of part 1 were combined and then the mixed ingredients of part 2 was added with mixing. Each clearcoat was then sprayed on basecoated (coated with Chroma System basecoat, available from DuPont®) hoods by a spray expert. Both systems applied well and had good appearance. Sanding and rating of the sample was done by an applications expert and was performed with commercially available 3M® brand 1500 grit microfinish sandpaper. The sanding performance of comparative example A was just below commercially acceptable, meaning that it was difficult to sand at 90 minutes and it had a tough feel when it was sanded. The coating of example 19 was sanded at 85 minutes and it was of commercial quality, with no tough feel.

TABLE 2

| Part | Ingredients | Comparative Example A | Example 19 |
|---|---|---|---|
| 1 | ChromaClear ® G2-4700S[1] | 361.5 | 361.5 |
| | ChromaPremier ® Reducer 12375[1] | 196.1 | 106.1 |
| | 2% DBTDL in ethyl acetate | | 1.33 |
| 2 | ChromaClear ® G2-4508S medium temperature activator[1] | 132.3 | |
| | Desmodur N 3300[2] | | 84.91 |
| | Example 15 | | 35.6 |
| | Methyl amyl ketone | | 15.6 |
| | Exxate 600 ®[3] | | 15.6 |

DBTDL = dibutyl tin dilaurate
[1]Available from DuPont ®, Wilmington, DE
[2]Available from Bayer Material Science ®, Pittsburgh, PA
[3]Available from Exxon ®

Primer Surfacer Examples

All the ingredients in table 3 of part 1 were combined and all the ingredients of part 2 were combined, then part 2 was added to part 1 with mixing. A spray expert sprayed each of the primers onto electrocoated hoods at 76° F. Three coats of each of the primers was applied to a film build of 5 mils. All three primers sprayed well. The primers were allowed to cure for 1.5 hours then they were sanded. The results of the sanding are given in Table 4.

TABLE 3

| Part | Ingredients | Comparative B | Example 20 | Example 21 |
|---|---|---|---|---|
| 1 | ChromaPremier ® 32430S ™[1] | 812.2 | 812.2 | 812.2 |

TABLE 3-continued

| Part | Ingredients | Comparative B | Example 20 | Example 21 |
|---|---|---|---|---|
|  | ChromaPremier ® Reducer 12375S [1] | 86.4 | 86.4 | 86.4 |
| 2 | Methyl amyl ketone | 19.2 | 18.9 | 18.9 |
|  | Desmodur Z 4470 BA [2] | 7.1 |  |  |
|  | N-Pentyl propianate | 3.8 | 3.8 | 3.8 |
|  | ChromaPremier ® Reducer 12375 [1] | 11.8 | 11.8 | 11.8 |
|  | Example 11 |  | 8.9 |  |
|  | Example 5 |  |  | 8.9 |
|  | Example 18 | 59.3 | 57.9 | 57.9 |
|  | 10% Dibutyl tin dilaurate in methyl amyl ketone | .24 | .24 | .24 |

[1] Available from DuPont ®, Wilmington, DE
[2] Available from Bayer MaterialScience ®, Pittsburgh, PA Hand sanding was done with dry P400 grit sandpaper.

Sand through was done using a dual action (random orbit) sanding machine with dry 400 grit sandpaper.

Sand through ratings
4—substantial clogging
4+—less clogging than a 4 rating
6—loading, but no clogging
7—no clogging no loading Any coating with a 6 or above is considered to be of commercial quality.

TABLE 4

|  | Comparative B | Example 20 | Example 21 |
|---|---|---|---|
| Hand sand | Grabby - clogged | Not grabby, slight clog | Not grabby, little clog |
| Sand through, Wear index | 4- not commercial | 4+ better not commercial | 6 - commercial |

Clear Coating Example 2

The following binder polymers were used and then mixed below with other ingredients to form the clearcoat of this example.

Preparation of Hydroxy-Functional Acrylic Copolymer-#1

To a 2-liter flask fitted with an agitator, water condenser, thermocouple, nitrogen inlet, heating mantle, and addition pumps and ports was added 305.3 g. xylene which was agitated and heated to reflux temperature (137° C. to 142° C.). A monomer mixture comprising of 106.1 grams styrene, 141.4 grams methyl methacrylate, 318.3 grams isobutyl methacrylate, 141.4 grams hydroxyethyl methacrylate and 10.4 grams xylene was then added to the flask via the addition pumps and ports simultaneously with an initiator mixture comprising 17.0 grams t-butyl peracetate and 85.2 grams xylene. The monomer mixture was added over 180 minutes and the addition time for the initiator mixture was also 180 minutes. The batch was held at reflux (137° C. to 142° C.) throughout the polymerization process. An initiator mixture comprising of 4.3 g t-butyl peracetate and 57.8 grams methyl ethyl ketone was then immediately added to the reaction mixture over 60 minutes and the batch was subsequently held at reflux for 60 minutes. The batch was then cooled to below 90° C. and 13.0 grams of methyl ethyl ketone were added. The resulting polymer solution has weight solids of 60% and viscosity of 14,400 cps. The number average molecular weight of the acrylic polymer was 5,000 and weight average molecular weight was 11,000, as determined by gel permeation chromatography (polystyrene standard).

Preparation of Polyester #1

A 2-liter flask equipped with an agitator, water condenser, thermocouple, nitrogen inlet, heating mantle, and addition pumps and ports was added 200 grams methyl amyl ketone, 136 grams pentaerythritol, 4.27 grams 9,10-dihydro-9-oxa-10-phosphaphenanthrenel[1], 3.14 grams tetraethylammonium bromide, and 490.2 grams of a methylhexahydrophthalic anhydride/hexahydrophthalic anhydride blend[2]. The mixture was heated to 140° C. Over a two-hour period, 253.22 grams of butylene oxide was added while maintaining the reaction at 140° C. The reaction was held at 140° C. until the acid number was below 2.0.

The solids content was tested to be 82.53%. The Gardner Holdt viscosity tested as z2. The weight-average molecular weight is 999 and the number-average molecular weight is 886.

(1) Available from Sanko Chemical Company® as Sanko HCA.
(2) Available from Milliken Chemical Company® as Milldride MHHPA.

The clearcoat was prepared as follows: The components of Part 1 were mixed and were added to the previously mixed components of Part 2. The compositions were sprayed onto basecoated (coated with Chroma System basecoat, available from DuPont) hoods by an application expert and were allowed to air-dry at ambient conditions for 90 minutes before testing the attributes.

TABLE 5

|  | Comparative Example C | Example 22 | Example 23 | Example 24 |
|---|---|---|---|---|
| Part 1 |  |  |  |  |
| Hydroxy-Functional Acrylic Copolymer #1 | 42.70 | 42.53 | 42.51 | 42.52 |
| Methyl N-amyl ketone | 4.00 | 4.00 | 4.01 | 4.00 |
| Acetone | 20.99 | 22.62 | 22.75 | 22.82 |
| Methyl isobutyl ketone | 5.92 | 5.92 | 5.92 | 5.92 |
| Toluene | 1.26 | 1.26 | 1.26 | 1.26 |
| Polyester #1 | 1.30 | 1.30 | 1.29 | 1.29 |
| Tinuvin 384-2 [1] | 0.39 | 0.39 | 0.39 | 0.39 |
| Tinuvin 292 [1] | 0.37 | 0.37 | 0.37 | 0.37 |
| BYK-358 [2] | 0.28 | 0.28 | 0.28 | 0.28 |
| BYK-306 [2] | 0.24 | 0.24 | 0.24 | 0.24 |
| 10% triethylene diamine in Xylene | 0.22 | 0.22 | 0.22 | 0.22 |
| Glacial Acetic Acid | 0.09 | 0.09 | 0.09 | 0.09 |
| 2% dibutyl tin dilaurate in Ethyl Acetate | 0.79 | 0.79 | 0.79 | 0.79 |
| Part 2 |  |  |  |  |
| Desmodur N3300A [3] | 9.23 | 9.12 | 9.14 | 9.13 |
| Butyl Acetate | 6.17 | 4.51 | 4.39 | 4.32 |
| Xylene | 2.80 | 2.80 | 2.80 | 2.80 |
| Exxate 600 [4] | 2.11 | 2.11 | 2.11 | 2.11 |
| Desmodur Z 4470 BA [3] | 1.15 | 0.00 | 0.00 | 0.00 |
| Example #16 |  | 1.45 | 0.00 | 0.00 |
| Example #5 |  |  | 1.45 | 0.00 |
| Example #11 |  |  |  | 1.45 |
| total | 100.00 | 100.00 | 100.00 | 100.00 |

[1] Available from Ciba Specialty Chemicals ®
[2] Available from BYK Chemie ®
[3] Available from Bayer MaterialScience ®, Pittsburgh, PA
[4] Available from Exxon ®

Print rating provided by application specialist and is an assessment of the severity of the finger print damage after thumb pressure is applied by a spray expert to the coating.

4—deep print mark that is very slow to heal
5—just commercial—some print mark—heals faster (than for a 4 rating)
6—very little print mark, heals very quickly Sanding was performed by hand with wet 1500 grit paper.
Scale: 4—not commercial, surface exhibits resistance to sanding—not smooth
5—just commercial, easier sanding—less resistance
6—even easier sanding—

Buffing was performed using an portable orbital buffer
Scale: 4—not commercial, difficult to remove sand scratches, and/or severe marring of surface
5—just commercial, sand scratches easier to remove, less marring
6—even easier removal of sand scratches, very little if any marring Ratings with a (+) or (−) added, represent assessments slightly higher or lower than the specified rating number.

Tape—print

Adhesive tape is applied to coated surface prior to buffing. Tape is removed after buffing approximately 10 minutes the surface is inspected for damage (print).

Normally check to see if the damage disappears (surface heals).

The examples described exhibited better print hardness and tape print performance (both directly related to faster cure) versus the comparative example.

Sanding was done by hand with wet 1500 grit paper.

Buffing was performed using a portable orbital buffer.

The examples described exhibited better print hardness and tape print performance (both directly related to faster cure) versus the comparative example.

TABLE 6

|  | Comparative Example C | Example 22 | Example 23 | Example 24 |
|---|---|---|---|---|
| Print (60 min) | 4+ (not commercial) | 5 (commercial) | 4.5 (just below commercial) | 4.5 (just below commercial) |
| Time before sand/buff (min) | 90 | 90 | 90 | 90 |
| Sand | 6− | 6 | 6 | 6 |
| Buff | 6 | 6− | 6 | 6.5 |
| Comments | fast scratch removal; print mark never healed | Fair scratch removal initial print mark, but healed | fair scratch removal - initial print mark, but healed | good scratch removal initial print mark, but healed |
| Tape print | | | | |

The invention claimed is:

1. A urea-containing polyisocyanate adduct mixture consisting essentially of the reaction product of;
   a) at least one aliphatic isocyanate trimer; and
   b) at least one cycloaliphatic isocyanate trimer in the presence of
   c) a urea-forming agent; and
wherein the mole ratio of said aliphatic to cycloaliphatic trimer is in the range of from 1:2 to 1:10 and the reaction product has a molecular weight average of from 500 to 3000 and an isocyanate functionality of at least 4.

2. The composition of claim 1 wherein said aliphatic isocyanate trimer is prepared from hexamethylene diisocyanate.

3. The composition of claim 1 wherein said cycloaliphatic isocyanate trimer is prepared from isophorone diisocyanate.

4. The composition of claim 1, wherein said reaction is conducted at a temperature of between 50° C. and 180° C.

5. A coating composition comprising
   a) a crosslinkable binder;
   b) a crosslinking component capable of crosslinking with said crosslinkable binder and;
   c) optionally a liquid carrier
wherein said crosslinkable binder has functional groups that are crosslinkable with b) and said crosslinking component comprises the polyisocyanate adduct mixture of claim 1.

6. The coating composition of claim 5 wherein said aliphatic isocyanate trimer is the isocyanurate of hexamethylene diisocyanate.

7. The coating composition of claim 5 wherein said cycloaliphatic isocyanate trimer is the isocyanurate of isophorone diisocyanate.

8. The coating composition of claim 5 wherein said coating composition is a solvent borne or a waterborne primer.

9. The coating composition of claim 5 wherein said coating composition is a solvent borne or a waterborne primer/surfacer.

10. The coating composition of claim 5 wherein said coating composition is a pigmented solvent borne and/or waterborne basecoat used in a basecoat/clearcoat paint system.

11. The coating composition of claim 5 wherein said coating composition is a solventborne clearcoat in a solvent borne and/or waterborne basecoat/clearcoat paint system.

12. The coating composition of claim 5 wherein said coating composition is a solvent borne or waterborne single stage paint system.

13. The coating composition of claim 5 wherein said coating composition is a waterborne coating composition.

14. The coating composition of claim 5 wherein said coating composition is a solvent borne coating composition.

15. The coating composition of claim 5 wherein said coating composition is a powder coating.

16. The coating composition of claim 5 wherein said coating composition is suitable for the production of the basecoat or clearcoat or undercoat in a clearcoat/color coat finish for automobiles and trucks.

17. A substrate coated with a dried cured layer of the coating composition of claim 5.

18. An automotive substrate coated with a dried cured multi-layer coating, wherein at least one of the dried cured coating layers is the coating composition of claim 5.

19. A process for preparing a urea-containing polyisocyanate adduct mixture having a functionality of at least 4 which consists essentially of reacting an aliphatic isocyanate trimer and a cycloaliphatic isocyanate trimer; wherein each of said aliphatic isocyanate trimer and cycloaliphatic isocyanate trimer has an average isocyanate functionality of at least 2.8; and contain at least 50 mole percent of isocyanurate and/or iminooxadiazine dione groups, based on the total moles of isocyanate adduct groups present in said isocyanate trimers, with 0.01 to 0.15 moles of water for each equivalent of isocyanate groups in the isocyanate trimers at a temperature of 50 to 180° C. to incorporate urea-groups into the polyisocyanate adduct mixture, wherein the mole ratio of aliphatic isocyanate trimer to cycloaliphatic isocyanate trimer is in the range of from 1:2 to 1:10.

* * * * *